United States Patent [19]

Sasaki et al.

[11] Patent Number: 4,661,563
[45] Date of Patent: Apr. 28, 1987

[54] POLYAMIDE-RUBBER BLEND COMPOSITION

[75] Inventors: Kouji Sasaki; Junji Koizumi, both of Nagoya, Japan

[73] Assignee: Toyoda Gosei Co., Ltd., Nishikasugai, Japan

[21] Appl. No.: 589,223

[22] Filed: Mar. 13, 1984

[30] Foreign Application Priority Data

Mar. 15, 1983 [JP] Japan .................................. 58-41576

[51] Int. Cl.$^4$ .......................... C08F 8/30; C08L 77/00
[52] U.S. Cl. .................................... 525/179; 525/113; 525/183; 525/184; 525/187
[58] Field of Search ............... 525/179, 113, 187, 183, 525/184

[56] References Cited

U.S. PATENT DOCUMENTS 3,351,517  11/1967  Willis .................................. 525/187
3,639,651   1/1972  Komuro ............................. 525/187
4,173,556  11/1979  Coran et al. ........................ 524/169
4,297,453  10/1981  Coran et al. ........................ 525/430

Primary Examiner—Lewis T. Jacobs
Assistant Examiner—A. L. Carrillo
Attorney, Agent, or Firm—Cushman, Darby & Cushman

[57] ABSTRACT

A polyamide-rubber blend composition is disclosed. The composition is prepared by mixing the following components (a) and (b) under heating in the presence of a crosslinking agent.
(a) 70 to 40 vol % of a rubber composition made of 5 to 40 vol % of an acrylonitrile-butadiene copolymer rubber and 95 to 50 vol % of an epichlorohydrin rubber; and
(b) 30 to 60 vol % of a polyamide resin, the gel fraction of the rubber composition (a) in the blend composition is at least 70 wt %.

The acrylonitrile-butadiene copolymer rubber of the composition preferably contains not less than 1.5 wt % of a carboxyl group in the polymer.

2 Claims, 3 Drawing Figures

POLYAMIDE-RUBBER BLEND COMPOSITION

FIELD OF THE INVENTION

The present invention relates to a polyamide-rubber blend composition having good heat-aging characteristics, as well as high strength, great resistance to cracking and gasolines, and improved flexibility.

BACKGROUND OF THE INVENTION

Replacement of automotive rubber hoses (such as those used for delivery of gasolines) by more durable and lighter polyamide resin hoses is under current review. However, polyamide resin hoses are not as flexible as rubber hoses, and efforts are being made to improve the flexibility of polyamide resins.

The conventional approach for improving the flexibility of polyamide resins is either by compounding a plasticizer with the polyamide resin or by copolymerizing or blending rubber with the polyamide resin. However, the first method has not a great practical feasibility because the plasticizer evaporates under heated conditions or it is extracted with oils or solvents (e.g. gasoline), and in either case, the flexibility of the polyamide resin is significantly reduced. When the polyamide resin is copolymerized with rubber, the melting point of the resin is usually reduced and this is not desired for the intended use of the polyamide resin under elevated temperatures. As a rubber material to be blended with the polyamide resin, acrylonitrile-butadiene copolymer rubbers (hereunder referred to as nitrile rubber) are particularly selected because the blend must withstand the environment of use where it is brought into contact with oils or solvents (e.g. gasoline). U.S. Pat. No. 4,173,556 proposed a method of heating the blend of nitrile rubber and polyamide resin in the presence of a crosslinking agent so that the nitrile rubber being crosslinked is dispersed in the polyamide resin. However, in either method, the inherently good heat-aging characteristics of the polyamide resin are greatly impaired when it is blended with the nitrile rubber.

Therefore, the present inventors have made various studies to produce a polyamide-rubber blend composition having not only good heat-aging characteristics but also high strength, great resistance to cracking and gasolines, and improved flexibility. This object can be achieved by the present invention which will be described hereinafter in detail.

SUMMARY OF THE INVENTION

The present invention provides a polyamide-rubber blend composition having not only good heat-aging characteristics but also high strength, great resistance to cracking due to ozone exposure or elongation, and improved flexibility.

The polyamide-rubber blend composition of the present invention is produced by mixing the following components under heating in the presence of a crosslinking agent:

(a) 70 to 40 vol% of a rubber composition made of 5 to 50 vol% of an acrylonitrile-butadiene copolymer rubber and 95 to 50 vol% of an epichlorohydrin rubber; and (b) 30 to 60 vol% of a polyamide resin.

The blend composition is also characterized in that the gel fraction of the rubber composition (a) is at least 70 wt%.

DETAILED DESCRIPTION OF THE INVENTION

Figure 1:
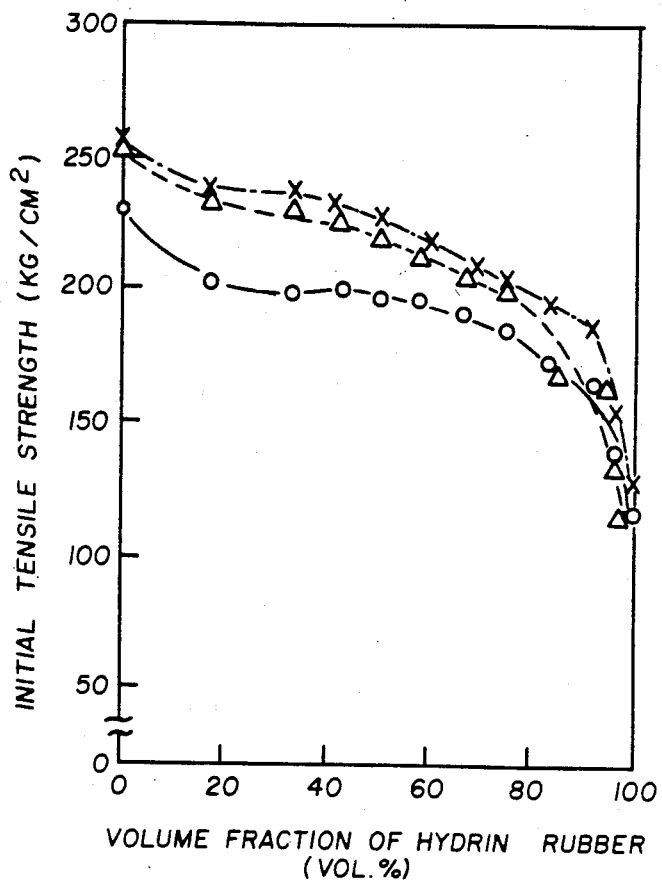
FIG. 1 is a graph showing the relation between the volume fraction (vol %) of hydrin rubber (abscissa) and initial tensile strength ($kg/cm^2$) (ordinate) for the blend compositions prepared in Examples 1 to 17 and Comparative Examples 1 to 17. The curves -o-, -Δ- and -x- are ploted from the results shown in Tables 1, 2 and 3, respectively.

The polyamide resin used in the composition of the present invention is a crystalline thermoplastic resin having an amido bond in the polymer structure. Illustrative polyamide resins include polycaprolactam (nylon 6), polylauryl lactam (nylon 12), polyhexamethylene adipamide (nylon 6,6), a condensation polymer of 11-aminoundecanoic acid (nylon 11), polyhexamethylene azelamide (nylon 6,9) and polyhexamethylene sebacamide (nylon 6,10). Suitable polyamide resins also include copolymers with other monoers, as well as those copolymerized with rubber to such an extent that the melting point of the resulting polyamide is not significantly reduced (preferably having a melting of at least 160° C.)

Illustrative nitrile rubbers that are used in the composition of the present invention include copolymers of monomers conventionally used to formulate nitrile rubbers such as acrylonitrile and butadiene, as well as multicomponent polymers wherein a major proportion of these monomers is copolymerized with isoprene or acrylate esters. Copolymers having a bound acrylonitrile content of 10 to 55 wt% and whose glass transition point is not higher than 10° C. and also included in the category of the nitrile rubber. Preferred examples are those copolymers with a carboxyl group content of 1.5 wt% or more which are obtained by copolymerizing acrylonitrile or butadiene with acrylic acid or methacrylic acid.

Illustrative epichlorohydrin rubbers that can be used in the composition of the present invention include epichlorohydrin homopolymers and its copolymers with allylglycidyl ether.

If the proportion of the composition (a) consisting of the nitrile rubber and epichlorohydrin ribber to the total volume of the polyamide-rubber blend composition is less than 40 vol%, the flexibility of the polyamide resin is not sufficiently improved. If the proportion of the composition (a) exceeds 70 vol% of the blend composition, the thermoplasticity of the polyamide resin is impaired and the processability of the final blend is significantly reduced.

In the rubber composition (a), the nitrile rubber is contained in an amount of 5 to 50 vol% of the total volume of the rubber composition whereas the epichlorohydrin rubber is contained in an amount of 95 to 50 vol% of the total volume of the composition. If the proportion of the nitrile rubber exceeds 50 vol%, the thermal aging resistance of the final blend composition is greatly decreased. If the nitrile rubber content is less than 5 vol%, the strength and cracking resistance of the final blend are decreased.

In order to further improve its strength and processability, the blend composition of the present invention may contain carbon black, white fillers, plasticizers, processing aids, coloring pigments, and many other additives conventionally compounded in resins and rubbers.

Crosslinking agents suitable for use with the nitrile rubber in the composition of the present invention include sulfur compounds and maleimide compounds. For use with a carboxyl containing nitrile rubber, metal oxide compounds, as well as epoxides and other compounds having a carboxyl group at the crosslinking site may be used. For use with the hydrin rubber, diamine compounds and triazine compounds may be used as crosslinking agents. If a copolymer of epichlorohydrin and allylglycidyl ether is used as the hydrin rubber, sulfur compounds or maleimide compounds may be used as crosslinking agents. Since these also serve as the crosslinking agent for the nitrile rubber, different crosslinking agents need not be used for the two rubbers if one of them is a copolymer of epichlorohydrin and allylglycidyl ether.

A suitable crosslinking agent may be selected from among the compounds listed above. Those which are capable of completing the crosslinking of the nitrile and hydrin rubbers within a mixing period of about 5 to 30 minutes are preferred. If the crosslinking rate is too slow, the nitrile rubber or hydrin rubber is crosslinked before it is sufficiently dispersed in the polyamide resin and the uniformity of the resulting blend composition is greatly impaired. Too fast a crosslinking rate is also undesired since the rubbers are deteriorated. It is particularly necessary to avoid extended mixing if a fairly high proportion of the nitrile rubber is used.

It is essential for the blend composition of the present invention that the gel fraction of the rubber composition (a) be at least 70 wt% of the final blend composition. If the rubber composition has a gel fraction lower than 70 wt%, the strength and cracking resistance of the final blend composition are significantly reduced.

The gel fraction of the rubber composition (a) as used in this specification is a calculated value based on the amount of the residue obtained by two stages of Soxhlet extraction of the polyamide-rubber blend composition, first with m-cresol, then with toluene. The calculation formula is as follows:

$$\text{gel fraction (\%)} = \frac{W_g}{W_o \times \phi} \times 10^4$$

wherein $W_o$ (g) is the weight of the unextracted specimen, $\phi$ (%) is the proportion of the total weight of the nitrile and hydrin rubbers to the total weight of the components of the specimen, and $W_g$ (g) is the weight of the residue. The two Soxhlet extractions are effected under the following conditions:

Specimen weight: 50-200 mg
Temperature of m-cresol: 210°-250° C.
Duration of extraction with m-cresol: 48 hr
Temperature of toluene: 120°-140° C.
Duration of extraction with toluene: 24 hr.

One preferred method for producing the polyamide-rubber blend composition of the present invention is as follows. Suitable blenders are Banbury mixers, pressure kneaders, Brabender mixers, mixing extruders and heat transfer rolls that can be heated to a temperature higher than the melting point of the polyamide resin. A sealed type mixer that prevents the entrance of oxygen (air) during mixing is preferred. Any one of these blenders may be charged with the polyamide resin, nitrile rubber, hydrin rubber, crosslinking agent and any optional additives at a temperature higher than the melting point of the polyamide resin, and these components are mixed until the rubbers are sufficiently crosslinked to provide a uniform polyamide-rubber blend composition.

Working examples of the present invention and comparative examples are shown below.

The formulations used in the examples and comparative examples are listed in Tables 1 to 6. Nylon 12 or nylon 11 was used as the polyamide resin. The crosslinking agent and crosslinking accelerator used were m-phenylenebismaleimide and benzothiazole disulfide, respectively. A Brabender mixer was set to a chamber temperature of 190° C. and a rotational speed of 80 rpm. A metered amount of the polyamide resin and nitrile and hydrin rubbers (for their types, see footnotes to Tables 1 to 6) were first charged into the mixer. Ten minutes later, metered amounts of the crosslinking agent and crosslinking accelerator were charged. As the crosslinking reaction proceeded, the mixing torque increased, reached a maximum and decreased thereafter. Thus, the mixing was continued until the decreasing torque reached a practically steady value. In the final stage of the mixing, stearic acid was charged, and following the mixing for another 2 minutes, the blend compositions were recovered from the chamber.

In all of the examples and comparative examples except for Comparative Examples 18, 20 and 26, the mixing was continued for 8 minutes after the mixing torque reached a maximum. In Comparative Examples 18 and 20 wherein no crosslinking agent was added, the mixing torque did not have a maximum value, so the mixing was performed for a period of 20 minutes. In Comparative Example 26, a polyamide resin alone was used with no additives. The samples prepared in the Examples and Comparative Examples were checked for their tensile strength, elongation at break and cracking resistance properties. The results are summarized in Tables 1 to 6. The results in Examples 1 to 17 and Comparative Examples 1 to 17 and also shown in FIGS. 1 to 3.

Comparative Example 1 in Table 1 refers to the blend composition of polyamide resin and nitrile rubber. The initial elongation at break of this composition was as great as 240%, but after thermal aging, its elongation at break was only 10%. Therefore, the thermal aging resistance of the blend of polyamide and nitrile rubber was very low.

Comparative Examples 2 to 4 and Examples 1 to 6 refer to blend compositions of polyamide resin, nitrile rubber and hydrin rubber. The samples of Examples 1 to 6 wherein the volume fraction of the hydrin rubber was not less than 50% of the total volume of the rubbers were much more heat-resistant than the samples of Comparative Examples 2 to 4 having less than 50 vol% of the hydrin rubber. After thermal aging, the sample of Example 1 having 50 vol% of the hydrin rubber had an elongation at break which was six times as high as that of the sample of Comparative Example 1, and the sample of Example 5 with 83 vol% of hydrin rubber had a 15-fold elongation at break. When the volume fraction of the hydrin rubber exceeded 95% as in Comparative Examples 5 and 6, the initial tensile strength and elongation at break were significantly reduced. Furthermore, the cracks that developed as a result of elongation and ozone exposure were so large that the samples of Comparative Examples 5 and 6 had no practical value.

Table 2 shows the data for blend compositions consisting of polyamide resin, hydrin rubber and a nitrile rubber containing a carboxyl group. Table 3 shows the data for blend compositions consisting of the carboxyl containing nitrile rubber, a hydrin rubber made of epichlorohydrin-allylglycidyl ether copolymer, and nylon 11. The two sets of data are similar to the data shown in Table 1: when the volume fraction of the hydrin rubber was not less than 50% of the total volume of the rubbers, a marked improvement in elongation at break after thermal aging was achieved, but when the content of hydrin rubber exceeded 95 vol%, the initial tensile strength and elongation at break were appreciably decreased, and the cracks that developed owing to elongation and ozone exposure had a commercially unacceptable size.

Figure 2:
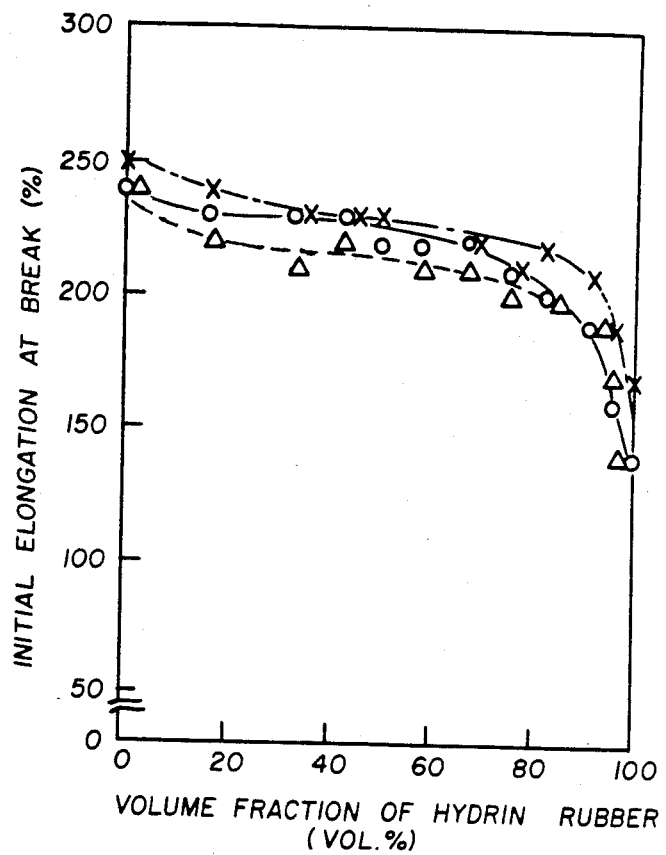
FIG. 2 is a graph showing the relation between the volume fraction (vol%) of hydrin rubber (abscissa) and initial elongation at break (%) (ordinate) for the blend compositions prepared in Examples 1 to 17 and Comparative Examples 1 to 17. The curves -o-, -Δ- and -x- are plotted from the results shown in Tables 1, 2 and 3, respectively.
Figure 3:
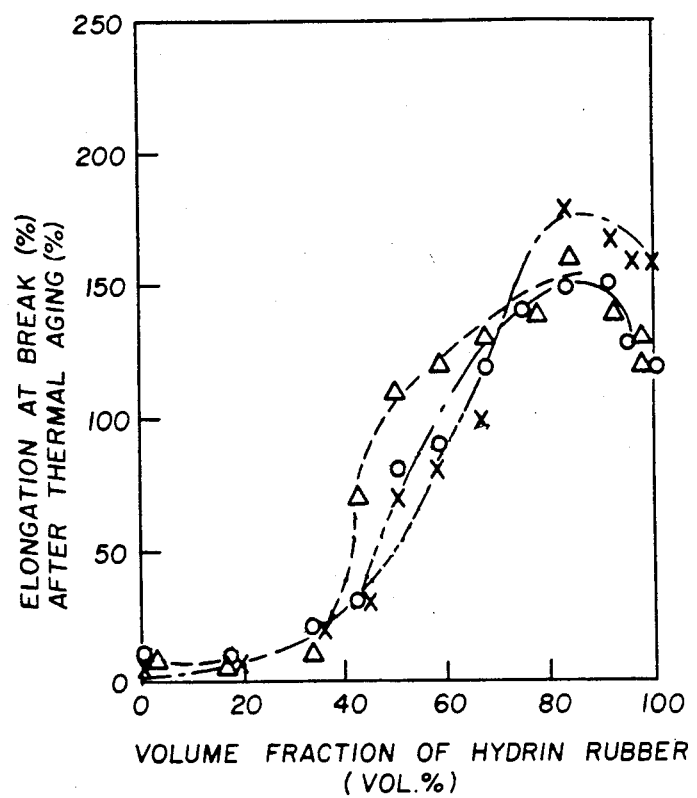
FIG. 3 is a graph showing the relation between the volume fraction (vol%) of hydrin rubber (abscissa) and elongation at break (%) after thermal aging (ordinate) for the blend compositions prepared in Examples 1 to 17 and Comparative Examples 1 to 17. The curves -o-, -Δ- and -x- are plotted from the results shown in Tables 1, 2 and 3, respectively.

The effects of the content of the hydrin rubber on the initial tensile strength, initial elongation at break and the elongation at break after thermal aging are visualized in FIGS. 1 to 3, from which one can see that blend compositions having high initial strength, good thermal-aging properties and high resistance to cracking are obtained if the volume fraction of the hydrin rubber (or nitrile rubber) to the total volume of the rubbers is within the range of 50 to 95% (or 50 to 5%).

Table 4 lists blend compositions that were prepared by using varying amounts of the crosslinking agent. By reading this table, one can see the criticality of the gel fraction of the nitrile-hydrin rubber composition.

The comparative samples having gel fractions of less than 70 wt% had very low values of initial tensile strength and elongation at break. Furthermore, the cracks that developed owing to elongation and ozone exposure were so large that these comparative samples were entirely unsuitable for practical use. It is therefore necessary for the present invention that the nitrile and hydrin rubbers be crosslinked during mixing with the polyamide resin so that a gel fraction of at least 70 wt% is attained.

FIG. 5 lists blend compositions, four of which were prepared by using 58 vol% of a hydrin rubber and nitrile rubbers having varying contents of carboxyl group, and the other four of which were prepared by using no hydrin rubber. Again, the samples according to the present invention were much improved over the comparative samples. Of the samples according to the present invention, those of Examples 25 and 26 were superior to those of Examples 23 and 24 with respect to the resistance to cracking due to elongation and ozone exposure. This shows that in order to prepare blend compositions that are to be used in applications where great elongation or contact with aerial ozone is expected, it is preferred to use a nitrile rubber having more than 1.5 wt% of a carboxyl group.

Table 6 shows blend compositions having varying volume fractions of the nitrile-hydrin rubber composition with respect to the polyamide resin. The three comparative samples having less than 40 vol% of the rubber composition had great values of 50% tensile stress and could scarcely benefit from the ability of the rubber composition to improve the flexibility of the polyamide resin. In the tensile test, the comparative samples experienced "necking" and plastic deformation and hence did not have the characteristics of a good elastomer. The sample of Comparative Example 29 having more than 70 vol% of the rubber composition had such a low degree of thermoplasticity that the blend composition defied subsequent shaping.

The polyamide-rubber blend composition of the present invention provides articles having improved flexibility, high strength, good heat-aging characteristics and great resistance to cracking. Therefore, the composition of the present invention can be extensively used in articles that are subjected to vibrational strain and hot atmospheres, for example, rubber articles to be used in the engine compartment of an automobile.

TABLE 1

|  | Comparative Examples | | | | Examples | | | | | | Comparative Examples | |
| --- | --- | --- | --- | --- | --- | --- | --- | --- | --- | --- | --- | --- |
|  | 1 | 2 | 3 | 4 | 1 | 2 | 3 | 4 | 5 | 6 | 5 | 6 |
| Composition (parts by weight) | | | | | | | | | | | | |
| Nylon 12*[1] | 40 | 40 | 40 | 40 | 40 | 40 | 40 | 40 | 40 | 40 | 40 | 40 |
| Nitrile rubber No. 1*[2] | 60 | 50 | 40 | 35 | 30 | 25 | 20 | 15 | 10 | 5 | 2.5 | 0 |
| Hydrin rubber No. 1*[3] | 0 | 13 | 27 | 33 | 40 | 47 | 54 | 60 | 67 | 74 | 77 | 80 |
| m-Phenylenebismaleimide | 2 | 2 | 2 | 2 | 2 | 2 | 2 | 2 | 2 | 2 | 2 | 2 |
| Dibenzothiazole disulfide | 1 | 1 | 1 | 1 | 1 | 1 | 1 | 1 | 1 | 1 | 1 | 1 |
| Stearic acid | 2 | 2 | 2 | 2 | 2 | 2 | 2 | 2 | 2 | 2 | 2 | 2 |
| Polymer fractions (vol %)*[4] | | | | | | | | | | | | |
| Rubber vol. fraction | 60 | 60 | 60 | 60 | 60 | 60 | 60 | 60 | 60 | 60 | 60 | 60 |
| Nitrile rubber vol. fraction | 100 | 83 | 67 | 58 | 50 | 42 | 33 | 25 | 17 | 8 | 4 | 0 |
| Hydrin rubber vol. fraction | 0 | 17 | 33 | 42 | 50 | 58 | 67 | 75 | 83 | 92 | 96 | 100 |
| Gel fraction (wt %) | 80 | 82 | 81 | 79 | 85 | 83 | 78 | 81 | 88 | 76 | 82 | 83 |
| Initial properties*[5] | | | | | | | | | | | | |
| Tensile strength (kg/cm$^2$) | 230 | 202 | 198 | 200 | 196 | 198 | 191 | 185 | 172 | 166 | 140 | 117 |
| Elongation at break (%) | 240 | 230 | 230 | 230 | 220 | 220 | 220 | 210 | 200 | 190 | 160 | 140 |
| Thermal aging characteristics*[6] | | | | | | | | | | | | |

TABLE 1-continued

|  | Comparative Examples | | | | Examples | | | | | | Comparative Examples | |
|---|---|---|---|---|---|---|---|---|---|---|---|---|
|  | 1 | 2 | 3 | 4 | 1 | 2 | 3 | 4 | 5 | 6 | 5 | 6 |
| Tensile strength (kg/cm²) | 223 | 187 | 199 | 191 | 185 | 182 | 172 | 178 | 155 | 152 | 131 | 125 |
| Elongation at break (%) | 10 | 10 | 20 | 30 | 80 | 90 | 120 | 140 | 150 | 150 | 130 | 120 |
| Cracking resistance*[7] | | | | | | | | | | | | |
| Size of cracks due to elongation (μm) | no crack | no crack | 2 | 2 | 2 | 4 | 4 | 4 | 6 | 8 | 10 | 10 |
| Size of cracks due to ozone exposure (μm) | 6 | 8 | 7 | 6 | 7 | 8 | 8 | 6 | 8 | 8 | 10 | 10 |

*[1] polylauryl lactam, L-1949, of Daicel Chemical Industries, Ltd.
*[2] acrylonitrile-butadiene copolymer rubber, JSR N-230S, of Japan Synthetic Rubber Co., Ltd. (bound acrylonitrile content: 35 wt %, Mooney viscosity: 56 $ML_{1+4}$ at 100° C.)
*[3] epichlorohydrin-ethyleneoxide-allylglycidyl ether copolymer rubber, Gecron 3100, of The Japanese Geon Co., Ltd.
*[4] volume fraction of rubber = $(V_N + V_E)/(V_N + V_E + V_A) \times 100$; volume fraction of nitrile rubber = $V_N/(V_N + V_E) \times 100$; volume fraction of hydrin rubber = $V_E/(V_N + V_E) \times 100$; wherein $V_N$, $V_E$ and $V_A$ represent respectively the volumes of nitrile rubber, hydrin rubber and polyamide resin in a unit blend composition.
*[5] 20 ± 3° C., drawing speed of 50 mm/min.
*[6] measured under the conditions specified by *[5] after a thermal aging test was conducted at 120° C. × 12 days.
*[7] (1) The size of cracks developed due to elongation was determined by the following procedure. Test strips (10 mm × 80 mm) were elongated 20% with an ozone chuck and left in a cold dark room for 24 hours. The strips were removed from the chuck and cut into pieces (5 mm × 10 mm) which were transferred to a sample holder for scanning electron microscope (SEM) where they were bent in the direction of elongation and fixed. After shadowing by gold vapor deposition, SEM photomicrographs (× 1,000) of the samples were taken to determine the length of the largest crack that developed in a specific sample.
(2) The size of cracks developed due to ozone exposure was determined by the following procedure. Test strips (10 mm × 80 mm) were elongated and left in a cold dark room as above. Then, the strips were placed in an ozone bath (40° C., 50 pphm ozone) for 70 hours. The size of the largest crack that developed in each sample was determined as in (1).
(3) In the determination of the size of each type of cracks, a blank sheet for the test strips was prepared and annealed by the following procedure. A specific sample material sandwiched between aluminum foils was charged into a mold. After preliminary heating at 210° C. for 2 minutes, the sample material was hydraulically pressed for 10 minutes at about 100 kg/cm² to form a sheet 0.5 mm thick. The so formed sheet with aluminum foils on it was removed from the mold and immediately water-quenched. After peeling off the aluminum foils, the sheet was annealed in vacuum at 150° C. for 1 hour.

TABLE 2

|  | Comparative Examples | | | | Examples | | | | | | Comparative Examples | |
|---|---|---|---|---|---|---|---|---|---|---|---|---|
|  | 7 | 8 | 9 | 10 | 7 | 8 | 9 | 10 | 11 | 12 | 11 | 6 |
| **Composition (parts by weight)*[1]** | | | | | | | | | | | | |
| Nylon 12*[2] | 40 | 40 | 40 | 40 | 40 | 40 | 40 | 40 | 40 | 40 | 40 | 40 |
| Nitrile rubber with carboxyl group | 60 | 50 | 40 | 35 | 30 | 25 | 20 | 15 | 10 | 5 | 2.5 | 0 |
| Hydrin rubber No. 1*[3] | 0 | 13 | 27 | 33 | 40 | 47 | 54 | 60 | 67 | 74 | 77 | 80 |
| m-Phenylenebismaleimide | 2 | 2 | 2 | 2 | 2 | 2 | 2 | 2 | 2 | 2 | 2 | 2 |
| Dibenzothiazole disulfide | 1 | 1 | 1 | 1 | 1 | 1 | 1 | 1 | 1 | 1 | 1 | 1 |
| Stearic acid | 2 | 2 | 2 | 2 | 2 | 2 | 2 | 2 | 2 | 2 | 2 | 2 |
| **Polymer fractions (vol %)*[4]** | | | | | | | | | | | | |
| Rubber vol. fraction | 60 | 60 | 60 | 60 | 60 | 60 | 60 | 60 | 60 | 60 | 60 | 60 |
| Nitril rubber vol. fraction | 100 | 83 | 67 | 58 | 50 | 42 | 33 | 25 | 17 | 8 | 4 | 0 |
| Hydrin rubber vol. fraction | 0 | 17 | 33 | 42 | 50 | 58 | 67 | 75 | 83 | 92 | 96 | 100 |
| Gel fraction (wt %) | 83 | 80 | 77 | 82 | 79 | 85 | 86 | 90 | 84 | 86 | 82 | 83 |
| **Initial properties*[5]** | | | | | | | | | | | | |
| Tensile strength (kg/cm²) | 251 | 232 | 230 | 225 | 220 | 213 | 206 | 201 | 170 | 165 | 135 | 117 |
| Elongation at break (%) | 240 | 220 | 210 | 220 | 220 | 210 | 210 | 200 | 200 | 190 | 170 | 140 |
| **Thermal aging characteristics*[6]** | | | | | | | | | | | | |
| Tensile strength (kg/cm²) | 325 | 284 | 257 | 250 | 245 | 220 | 174 | 170 | 179 | 166 | 140 | 125 |
| Elongation at break (%) | 10 | 5 | 10 | 60 | 110 | 120 | 130 | 140 | 160 | 140 | 130 | 120 |
| **Cracking resistance*[7]** | | | | | | | | | | | | |
| Size of cracks due to elongation (μm) | no crack | no crack | no crack | no crack | no crack | no crack | no crack | 2 | 2 | 4 | 8 | 10 |
| Size of cracks due to ozone exposure (μm) | 3 | 3 | 2 | 3 | 2 | 3 | 4 | 3 | 2 | 4 | 9 | 10 |

*[1], *[3] to *[7] See the relevant footnotes to Table 1.
*[2] Carboxyl containing acrylonitrile-butadiene copolymer rubber, Nipol 1072, of The Japanese Geon Co., Ltd. (bound acrylonitrile content: 27 wt %, carboxyl group content: 3.1 wt %, Mooney viscosity: 48 $ML_{1+4}$ at 100° C.).

TABLE 3

|  | Comparative Examples | | | | Examples | | | | | | Comparative Examples | |
|---|---|---|---|---|---|---|---|---|---|---|---|---|
|  | 12 | 13 | 14 | 15 | 13 | 14 | 15 | 16 | 17 | 18 | 16 | 17 |
| Composition | | | | | | | | | | | | |

TABLE 3-continued

|  | Comparative Examples | | | | Examples | | | | | | Comparative Examples | |
| --- | --- | --- | --- | --- | --- | --- | --- | --- | --- | --- | --- | --- |
|  | 12 | 13 | 14 | 15 | 13 | 14 | 15 | 16 | 17 | 18 | 16 | 17 |
| (parts by weight) | | | | | | | | | | | | |
| Nylon 11*[1] | 40 | 40 | 40 | 40 | 40 | 40 | 40 | 40 | 40 | 40 | 40 | 40 |
| Nitrile rubber No. 2 with*[2] carboxyl group | 60 | 50 | 40 | 35 | 30 | 25 | 20 | 15 | 10 | 5 | 2.5 | 0 |
| Hydrin rubber No. 2*[3] | 0 | 14 | 28 | 34 | 41 | 48 | 55 | 62 | 69 | 76 | 79 | 83 |
| m-Phenylenebismaleimide | 2 | 1 | 2 | 2 | 2 | 2 | 2 | 2 | 2 | 2 | 2 | 2 |
| Dibenzothiazole disulfide | 1 | 1 | 1 | 1 | 1 | 1 | 1 | 1 | 1 | 1 | 1 | 1 |
| Stearic acid | 2 | 2 | 2 | 2 | 2 | 2 | 2 | 2 | 2 | 2 | 2 | 2 |
| Polymer fraction (vol %)*[4] | | | | | | | | | | | | |
| Rubber vol. fraction | 60 | 60 | 60 | 60 | 60 | 60 | 60 | 60 | 60 | 60 | 60 | 60 |
| Nitrile rubber vol. fraction | 100 | 83 | 67 | 58 | 50 | 42 | 33 | 25 | 17 | 8 | 4 | 0 |
| Hydrin rubber vol. fraction | 0 | 17 | 33 | 42 | 50 | 58 | 67 | 75 | 83 | 92 | 96 | 100 |
| Gel fraction (wt %) | 88 | 90 | 88 | 92 | 93 | 92 | 87 | 85 | 90 | 93 | 92 | 89 |
| Initial properties*[5] | | | | | | | | | | | | |
| Tensile strength (kg/cm$^2$) | 254 | 238 | 236 | 230 | 228 | 216 | 208 | 205 | 196 | 187 | 155 | 129 |
| Elongation at break (%) | 250 | 240 | 230 | 230 | 230 | 220 | 220 | 210 | 220 | 210 | 190 | 170 |
| Thermal aging characteristics*[6] | | | | | | | | | | | | |
| Tensile strength (kg/cm$^2$) | 290 | 257 | 258 | 242 | 239 | 221 | 184 | 190 | 179 | 172 | 152 | 145 |
| Elongation at break (%) | 5 | 5 | 20 | 30 | 70 | 80 | 100 | 140 | 180 | 170 | 160 | 160 |
| Cracking resistance*[7] | | | | | | | | | | | | |
| Size of cracks due to elongation ($\mu$m) | no cracks | no cracks | no cracks | no cracks | no cracks | no cracks | 2 | 2 | 4 | 5 | 8 | 11 |
| Size of cracks due to ozone exposure ($\mu$m) | 4 | 4 | 6 | 5 | 6 | 4 | 6 | 6 | 6 | 8 | 9 | 11 |

*[1]Condensation polymer of 11-aminoundecanoic acid, BESN-O-Tl, of Lilsan Corp.
*[2], *[4] to *[7]See the relevant footnotes to Table 1.
*[3]Epichlorohydrin-allylglycidyl ether copolymer rubber, Gecron 1100, of The Japanese Geon Co., Ltd.

TABLE 4

|  | Comparative Examples | | Examples | | | Comparative Examples | | Examples | | |
| --- | --- | --- | --- | --- | --- | --- | --- | --- | --- | --- |
|  | 18 | 19 | 2 | 19 | 20 | 20 | 21 | 8 | 21 | 22 |
| Composition (parts by weight) | | | | | | | | | | |
| Nylon 12*[1] | 40 | 40 | 40 | 40 | 40 | 40 | 40 | 40 | 40 | 40 |
| Nitrile rubber No. 1*[2] | 25 | 25 | 25 | 25 | 25 | | | | | |
| Nitrile rubber No. 2 with carboxyl group*[3] | | | | | | 25 | 25 | 25 | 25 | 25 |
| Hydrin rubber*[4] | 47 | 47 | 47 | 47 | 47 | 47 | 47 | 47 | 47 | 47 |
| m-Phenylenebismaleimide | | 1 | 2 | 3 | 5 | | 1 | 2 | 3 | 5 |
| Dibenzothiazole disulfide | | 1 | 1 | 1 | 1 | | 1 | 1 | 1 | 1 |
| Stearic acid | 2 | 2 | 2 | 2 | 2 | 2 | 2 | 2 | 2 | 2 |
| Polymer fractions (vol %)*[5] | | | | | | | | | | |
| Rubber vol. fraction | 60 | 60 | 60 | 60 | 60 | 60 | 60 | 60 | 60 | 60 |
| Nitrile rubber vol. fraction | 42 | 42 | 42 | 42 | 42 | 42 | 42 | 42 | 42 | 42 |
| Hydrin rubber vol. fraction | 58 | 58 | 58 | 58 | 58 | 58 | 58 | 58 | 58 | 58 |
| Gel fraction (wt %) | 2 | 62 | 83 | 92 | 95 | 3 | 65 | 85 | 94 | 92 |
| Initial properties*[6] | | | | | | | | | | |
| Tensile strength (kg/cm$^2$) | 38 | 142 | 198 | 202 | 225 | 46 | 155 | 213 | 232 | 234 |
| Elongation at break (%) | 80 | 190 | 220 | 210 | 210 | 100 | 170 | 210 | 200 | 190 |
| Thermal aging characteristics*[7] | | | | | | | | | | |
| Tensile strength (kg/cm$^2$) | 45 | 138 | 182 | 195 | 223 | 55 | 168 | 220 | 242 | 253 |
| Elongation at break (%) | 100 | 90 | 90 | 110 | 100 | 120 | 110 | 120 | 110 | 100 |
| Cracking resistance*[8] | | | | | | | | | | |
| Size of cracks due to elongation ($\mu$m) | 12 | 8 | 4 | 4 | 3 | 10 | 6 | no cracks | no cracks | no cracks |
| Size of cracks due to ozone exposure ($\mu$m) | 16 | 12 | 8 | 6 | 6 | 14 | 10 | 3 | 2 | no cracks |

*[1]and *[2]See the relevant footnotes to Table 1.
*[3]See the relevant footnote to Table 2.
*[4]to *[8]See the relevant footnotes to Table 3.

TABLE 5

|  | Comparative Examples | | | | Examples | | | |
| --- | --- | --- | --- | --- | --- | --- | --- | --- |
|  | 22 | 23 | 24 | 25 | 23 | 24 | 25 | 26 |
| Composition (parts by weight) | | | | | | | | |
| Nylon 12*1 | 40 | 40 | 40 | 40 | 40 | 40 | 40 | 40 |
| Nitrile rubber No. 3*2 | 60 | | | | 25 | | | |
| Nitrile rubber No. 4*3 | | 60 | | | | 25 | | |
| Nitrile rubber No. 5*4 | | | 60 | | | | 25 | |
| Nitrile rubber No. 6*5 | | | | 60 | | | | 25 |
| Hydrin rubber No. 1*6 | | | | | 47 | 47 | 47 | 47 |
| m-Phenylenebismaleimide | 2 | 2 | 2 | 2 | 2 | 2 | 2 | 2 |
| Dibenzothiazole disulfide | 1 | 1 | 1 | 1 | 1 | 1 | 1 | 1 |
| Stearic acid | 2 | 2 | 2 | 2 | 2 | 2 | 2 | 2 |
| Polymer fractions (vol %)*7 | | | | | | | | |
| Rubber vol. fraction | 60 | 60 | 60 | 60 | 60 | 60 | 60 | 60 |
| Nitrile rubber vol. fraction | 100 | 100 | 100 | 100 | 42 | 42 | 42 | 42 |
| Hydrin rubber vol. fraction | 0 | 0 | 0 | 0 | 58 | 58 | 58 | 58 |
| Gel fraction (wt %) | 84 | 83 | 81 | 82 | 88 | 86 | 82 | 79 |
| Initial properties*8 | | | | | | | | |
| Tensile strength (kg/cm$^2$) | 258 | 260 | 268 | 275 | 196 | 225 | 216 | 235 |
| Elongation at break (%) | 230 | 240 | 230 | 220 | 210 | 220 | 220 | 220 |
| Thermal aging characteristics*9 | | | | | | | | |
| Tensile strength (kg/cm$^2$) | 262 | 258 | 240 | 266 | 205 | 238 | 235 | 246 |
| Elongation at break (%) | 10 | 5 | 10 | 5 | 90 | 100 | 110 | 130 |
| Cracking resistance*10 | | | | | | | | |
| Size of cracks due to elongation (μm) | no cracks | no cracks | no cracks | no cracks | 3 | 2 | no cracks | no cracks |
| Size of cracks due to ozone exposure (μm) | 8 | 6 | 3 | 2 | 8 | 5 | 3 | 3 |

*1, *6 to *10 See the relevant footnotes to Table 1.
*2 to *5 Carboxyl containing acrylonitrile-butadiene copolymer rubbers specially prepared by the present inventors. For their composition and Mooney viscosities, see the following table.

| Copolymer | Bound acrylonitrile content (wt %) | Carboxyl content* (wt %) | Mooney viscosity, ML$_{1+4}$ (100° C.) |
| --- | --- | --- | --- |
| Nitrile rubber No. 3 | 40 | 0 | 52 |
| Nitrile rubber No. 4 | 40 | 0.6 | 48 |
| Nitrile rubber No. 5 | 40 | 1.8 | 50 |
| Nitrile rubber No.6 | 40 | 2.6 | 46 |

*from methacrylic acid monomer.

TABLE 6

|  | Comparative Examples | | | Examples | | | | Comparative Example |
| --- | --- | --- | --- | --- | --- | --- | --- | --- |
|  | 26 | 27 | 28 | 27 | 28 | 8 | 29 | 29 |
| Composition (parts by weight) | | | | | | | | |
| Nylon 12*1 | 100 | 80 | 70 | 60 | 50 | 40 | 30 | 20 |
| Nitrile rubber No. 2 with carboxyl group*2 | | 8 | 12 | 17 | 21 | 25 | 29 | 33 |
| Hydrin rubber No. 1*3 | | 16 | 23 | 31 | 39 | 47 | 55 | 62 |
| m-Phenylenebismaleimide | | 2 | 2 | 2 | 2 | 2 | 2 | 2 |
| Dibenzothiazole disulfide | | 1 | 1 | 1 | 1 | 1 | 1 | 1 |
| Stearic acid | | 2 | 2 | 2 | 2 | 2 | 2 | 2 |
| Polymer fractions (vol %)*4 | | | | | | | | |
| Rubber vol. fraction | 0 | 20 | 30 | 40 | 50 | 60 | 70 | 80 |
| Nitrile rubber vol. fraction | — | 42 | 42 | 42 | 42 | 42 | 42 | 42 |
| Hydrin rubber vol. fraction | — | 58 | 58 | 58 | 58 | 58 | 58 | 58 |
| 50% Tensile stress*5 (kg/cm$^2$) | 321 | 272 (necking) | 240 (necking) | 201 | 162 | 115 | 83 | Shaping was impossible |

*1 to *4 See the relevant footnotes to Table 2.
*5 drawing speed = 50 mm/min at 20° C.

What is claimed is:

1. A uniform polyamide-rubber blend composition prepared by mixing the following components under heating in the presence of a crosslinking agent:
   (a) 70 to 40 vol% of a rubber composition made of 5 to 50 vol% of an acrylonitrile-butadiene copolymer rubber and 95 to 50 vol% of an epichlorohydrin rubber; and
   (b) 30 to 60 vol% of a polyamide resin, wherein the gel fraction of the rubber composition (a) in the polyamide-rubber blend composition is at least 70 wt% and components (a) and (b) have been mixed together such that the rubbers of component (a) are sufficiently crosslinked to provide a uniform polyamide-rubber blend composition.

2. A polyamide-rubber blend composition according to claim 1 wherein said acrylonitrile-butadiene copolymer rubber contains not less than 1.5 wt% of a carboxyl group in the polymer.

* * * * *